Dec. 3, 1946.　　S. E. BOUCHARD　　2,412,120

SPECTACLE TEMPLE CONNECTION

Filed June 28, 1945

SAMUEL E. BOUCHARD
INVENTOR

BY *H. A. Ellestad*
ATTORNEY

Patented Dec. 3, 1946

2,412,120

UNITED STATES PATENT OFFICE 2,412,120

SPECTACLE TEMPLE CONNECTION

Samuel E. Bouchard, Brighton, N. Y., assignor to Bausch & Lomb Optical Company, Rochester, N. Y., a corporation of New York Application June 28, 1945, Serial No. 602,079

3 Claims. (Cl. 88—53)

This invention relates to ophthalmic mountings and more particularly it has reference to means for pivotally mounting temples thereon.

As is well-known, the temples are hingedly mounted at the temporal sides of the spectacles in order to permit the temples to be folded down against the lenses when the spectacles are not in use. When the spectacles are new, the relation of the parts is such that there is a slight frictional engagement between the temple joint and the adjacent parts. However, after the spectacles have been used for some time, the frictional engagement disappears because of wear so that the temples swing freely about their hinge pivots and thereby produce the undesirable feature known in the art as "drop temple." Although a great many attempts have been made to solve this problem in a satisfactory, efficient, and simple manner, such attempts have failed for various reasons.

One of the objects of my invention is to overcome the above noted objections by providing an ophthalmic mounting embodying means for hingedly supporting a temple so that the joint of the latter will have ample frictional engagement with the adjacent parts of the mounting even after continued use of the mounting. Further objects are to provide an ophthalmic mounting which will be simple in structure, efficient in operation, and embody means for locking the temple screw and providing sliding frictional engagement between the temple joint and the screw. These and other objects and advantages reside in certain novel features of construction, arrangement, and combination of parts as well hereinafter be more fully described and pointed out in the appended claims.

Referring to the drawing.

Figure 1:
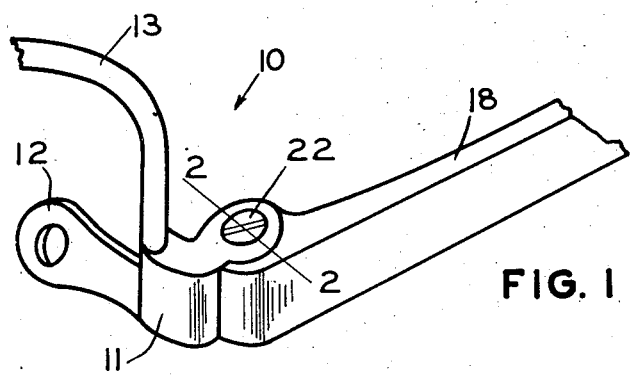
Fig. 1 is a fragmentary perspective view of an ophthalmic mounting embodying my invention.

A preferred embodiment of my invention is disclosed in the drawing wherein 10 indicates, generally, an ophthalmic mounting of the semi-rimless type having an endpiece 11 to which is secured a lens strap 12 and the rim member 13 which is adapted to extend along the rear surface of a lens, as is well-known in the art. The endpiece 11 is formed with the rearwardly extending integral, spaced upper ear 14 and lower ear 15. The upper ear 14 is provided with the aperture 16 which is in alignment with the smaller threaded aperture 17 in the lower ear 15. The temple 18 having a flat joint 19 provided with an aperture 20, is positioned between the ears 14 and 15 so that all of the apertures in the parts are in alignment. The temple 18 is pivotally secured to the endpiece by means of the screw 21 which passes through the apertures and is in threaded engagement with the aperture in ear 15. The screw 21 has an enlarged head 22 which is slightly smaller than the aperture 16 so that it may extend into the latter.

Figure 2:
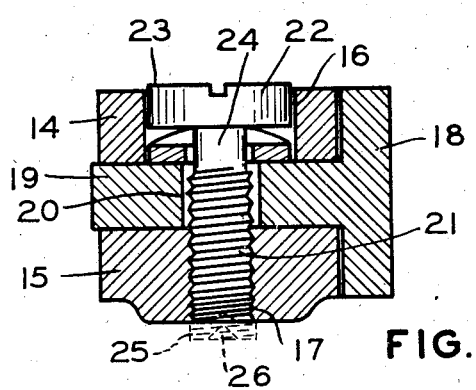
Fig. 2 is a vertical sectional view taken on line 2—2 of Fig. 1.
Figure 4:
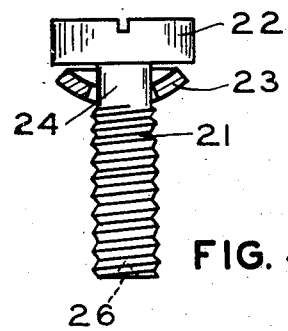
Fig. 4 is a view showing the washer, in section, assembled on the screw.
Figure 3:
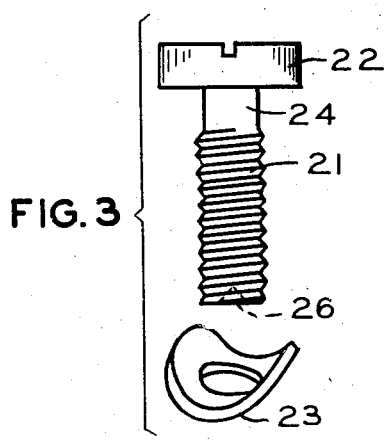
Fig. 3 is a view showing the temple screw and washer in disassembled relation.

In order to provide frictional resistance on the temple joint 19, a spring washer 23 is positioned between the upper face of temple joint 19 and the under side of the screw head 22. As shown in Fig. 3, the spring washer has a concave cylindrical form. The washer 23 is assembled on the screw 21 by slipping the threaded portion of the screw through the hole in the washer until the washer engages a reduced smooth portion 24 adjacent the screw head 22. Since the concave side of the washer is adjacent the under side of the screw head 22, the relatively sharp upper edge of the washer 23 will dig into the under side of the screw head 22 when the parts are assembled as shown in Fig. 2. In this relation, the convex or under side of the washer 23 is in sliding frictional engagement with the top face of the temple joint 19. The length of the screw 21 is such that when the parts are first assembled, the screw will project slightly beyond the outer surfaces of the ears 14 and 15. The end of the screw 21 will thus occupy a position shown, in exaggerated form, by means of the dotted line portion 25 on Fig. 2. Pressure is then applied between the two ends of the screw by a suitable plier or other means so that the threads of the end portion of the screw are slightly deformed and squeezed into locking engagement with the threads in the ear 15. Such slight deformation of the threads at the end of the screw is facilitated by forming a slight depression in the end of the screw as shown at 26.

From the foregoing description, it will be apparent that the screw 21 is held against rotation by the locking engagement of the adjacent threaded portions and since the upper edge of washer 23 digs into the under side of head 22, there will be little, if any, turning of washer 23 when the temple 18 turns about its pivot. Consequently, the convex under side of the washer 23 will always be in sliding frictional engagement with the upper face of the temple joint 19. I have thereby provided an efficient temple joint which will solve the "drop temple" problem in a simple, yet efficient, manner. A mounting embodying my invention presents a neat appearance and it can be readily manufactured and assembled, as will be apparent from the foregoing description. Various modifications may obviously be made without departing from the spirit of my invention as pointed out in the appended claims.

I claim:

1. In an ophthalmic mounting the combination of an endpiece having spaced ears provided with upper and lower aligned apertures, a temple having an aperture, said temple mounted between said ears with all of the apertures in alignment, the aperture in the lower ear being threaded, the aperture in the upper ear being larger than that in the lower ear, a screw passed through the apertures and threaded into the lower aperture, means for locking the screw against unintential turning, said screw having an enlarged head which fits freely into the larger aperture, and a concavely formed spring washer positioned on the screw and located between the head of the screw and the upper face of the temple joint, the concave side of the washer being adjacent the screw head, the uppermost parts of the edge of the washer being embedded in the screw head to thereby normally prevent turning of the washer, the convex side of the washer having sliding frictional engagement with the temple joint as the latter turns about the screw.

2. In an ophthalmic mounting, the combination of an endpiece having spaced ears provided with upper and lower aligned apertures, a temple having an aperture, said temple mounted between said ears with all of the apertures in alignment, the aperture in the lower ear being threaded, the aperture in the upper ear being larger than that in the lower ear, a screw passed through the apertures and threaded into the lower aperture, said screw having an enlarged head which fits freely into the larger aperture, and a concavely formed spring washer positioned on the screw and located between the head of the screw and the upper face of the temple joint, the concave side of the washer being adjacent the screw head, the uppermost parts of the edge of the washer being embedded in the screw head to thereby normally prevent unintentional turning of the washer, the convex side of the washer having sliding frictional engagement with the temple joint as the latter turns about the screw, and means for locking the screw against unintentional turning comprising a formation on the threaded end of the screw resulting from the application of pressure to the ends of the screw which initially project beyond the ears of the mounting.

3. In an ophthalmic mounting, the combination of an endpiece having spaced ears provided with upper and lower aligned apertures, a temple having an aperture, said temple mounted between said ears with all of the apertures in alignment, a securing element passed through the apertures, said element having an enlarged head which fits freely into one of the apertures in the ears, means for locking the element in position to prevent unintentional turning thereof, and a concavely formed spring washer positioned on the element and located between the head of the element and a face of the temple joint, the concave side of the washer being adjacent the head of the element, the uppermost parts of the edge of the washer being embedded in the head of the element to thereby normally prevent unintentional turning of the washer, the convex side of the washer having sliding frictional engagement with the temple joint as the latter turns about the element.

SAMUEL E. BOUCHARD.